United States Patent
Hamamoto et al.

(10) Patent No.: US 6,515,814 B1
(45) Date of Patent: Feb. 4, 2003

(54) DEVICE AND METHOD FOR REPRODUCING MAGNETIC SIGNAL

(75) Inventors: Masaki Hamamoto, Tenri (JP); Junichi Sato, Nara (JP); Yasushi Ogimoto, Noda (JP); Kunio Kojima, Nabari (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/493,386

(22) Filed: Jan. 28, 2000

(30) Foreign Application Priority Data

Jan. 29, 1999 (JP) .......................................... 11-021040

(51) Int. Cl.$^7$ .......................... G11B 5/02; G11B 11/00; G11B 11/10
(52) U.S. Cl. ................... 360/59; 369/13.01; 369/13.05; 369/13.27; 369/13.26
(58) Field of Search ............................. 360/59, 25, 31; 369/13.01, 13.02, 13.05, 13.11, 13.12, 13.27, 13.26; G11B 11/00, 11/10, 11/105, 11/115, 5/02

(56) References Cited

U.S. PATENT DOCUMENTS

| | | | | |
|---|---|---|---|---|
| 5,707,727 A | * | 1/1998 | Takahashi et al. | 428/332 |
| 6,278,667 B1 | * | 8/2001 | Belser | 369/13.01 |
| 6,333,827 B1 | * | 12/2001 | Hamamoto et al. | 360/59 |
| 6,400,654 B1 | * | 6/2002 | Sawamura et al. | 369/13.14 |

FOREIGN PATENT DOCUMENTS

| | | | | |
|---|---|---|---|---|
| JP | 4-176034 | 6/1992 | | |
| JP | 2000207701 A | * 7/2000 | | G11B/5/02 |
| JP | 2000222702 A | * 8/2000 | | G11B/5/02 |

* cited by examiner

Primary Examiner—David Hudspeth
Assistant Examiner—Dan I. Davidson
(74) Attorney, Agent, or Firm—Edwards & Angell, LLP; David G. Conlin; John J. Penny, V (57) ABSTRACT

The present invention provides a magnetic signal reproducing device including heating means for locally heating a reproducing region of a magnetic recording medium, first reproducing means for reading magnetic information in the reproducing region in a first temperature state to obtain a first reproduced signal, second reproducing means for reading magnetic information in almost the same region as the reproducing region in a second temperature state which is different from the first temperature state to obtain a second reproduced signal, and correcting means for correcting the first reproduced signal based on the second reproduced signal to obtain an information reproducing signal representing information recorded in the reproducing region.

According to this, even if a medium temperature in a non-heated region of the magnetic recording medium is shifted from a magnetization compensation point, a signal from the region is prevented from mixing into a reproducing signal.

15 Claims, 11 Drawing Sheets

DEVICE AND METHOD FOR REPRODUCING MAGNETIC SIGNAL

CROSS-REFERENCE TO RELATED APPLICATION

This application is related to Japanese application No. Hei 11(1999)-021040 filed on Jan. 29, 1999, whose priority is claimed nnder 35 §USC, the disclosure of which is incorporated by reference in its entirety.

BACKGROUND OF THE INVENTION

1. Field of the Invention

The present invention relates to a device and a method for reproducing a magnetic signal for magnetically performing reproduction while heating a recording medium. In particular, it relates to a device and a method for reproducing a magnetic signal capable of suppressing a crosstalk sent from an adjacent track and the like.

2. Description of the Related Art

In recent years, multimedia technologies have been developed and a memory device having a larger capacity has been highly demanded to deal with information having a large capacity. In particular, techniques for densifying a rewritable optical disc, a rewritable magnetic disc and a rewritable magnetic tape have been actively investigated.

Among them, there has been proposed a method for reproducing a magnetic signal capable of performing high density recording and reproduction (hereinafter referred to as a thermally assisted magnetic signal recording and reproducing method). In this method, a magnetic recording medium which changes its magnetic characteristics depending on a temperature is irradiated with light to locally provide a heated region on the medium and selectively and magnetically record or reproduce information only in the heated region.

An example of the thermally assisted magnetic signal recording and reproducing method described in Japanese Unexamined Patent Publication No. Hei 4(1992)-176034 will be described below.

In this example, a ferrimagnetic substance in which a magnetization becomes zero at a temperature close to a room temperature (hereinafter referred to as a magnetic compensation point) is used as a recording medium. For recording, a light beam is irradiated on a region in the recording medium where the recording is to be performed so as to heat up to around the Curie temperature, and an external magnetic field is applied by means of a recording head. Thus, information is recorded. On the other hand, for reproduction, a light beam is irradiated to heat on a region of the recording medium where the reproduction is to be performed. Thereby, the magnetization of the region is enhanced to detect a magnetic flux leaking therefrom with a reproducing head.

However, in order to implement the high density reproduction by the thermally assisted magnetic signal reproducing method of the above-described prior art (Japanese Unexamined Patent Publication No. Hei 4(1992)-176034), a magnetization in a region adjacent to a region where the reproduction is to be performed (hereinafter referred to as a reproducing portion) must be reduced as much as possible. For this reason, it is necessary to control a medium temperature in the adjacent region to close to the magnetic compensation point as accurately as possible. If the medium temperature is shifted from the magnetic compensation point, information transmitted from the adjacent region is superposed on a reproducing signal. Consequently, an accurate reproducing signal cannot be obtained. A specific example will be described below.

Figure 11:
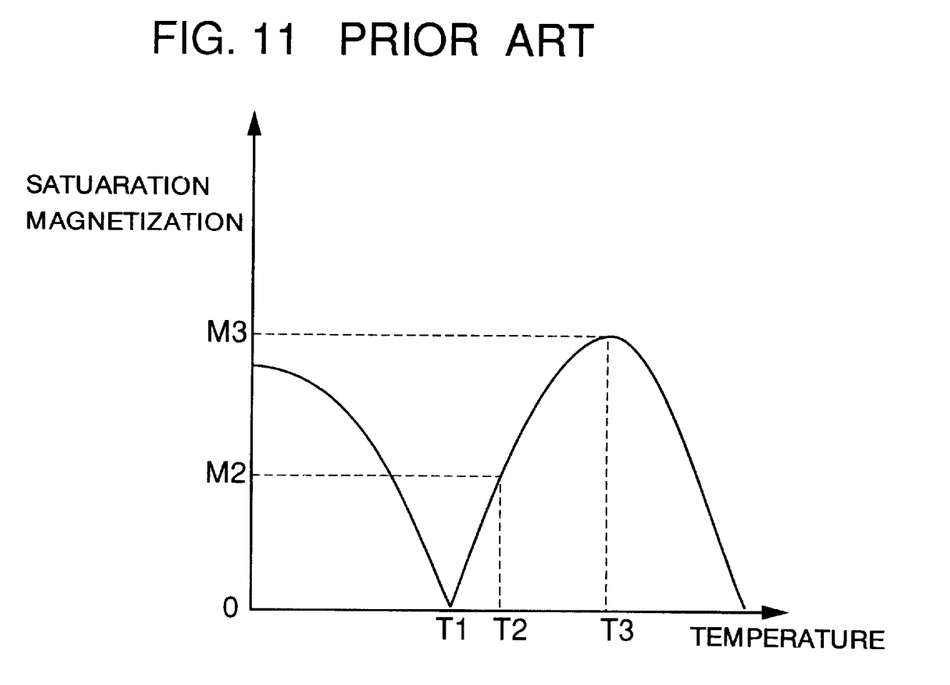
FIG. 11 is a graph illustrating a relationship between temperature and saturation magnetization in a common n-type ferromagnetic substance.
Figure 12:
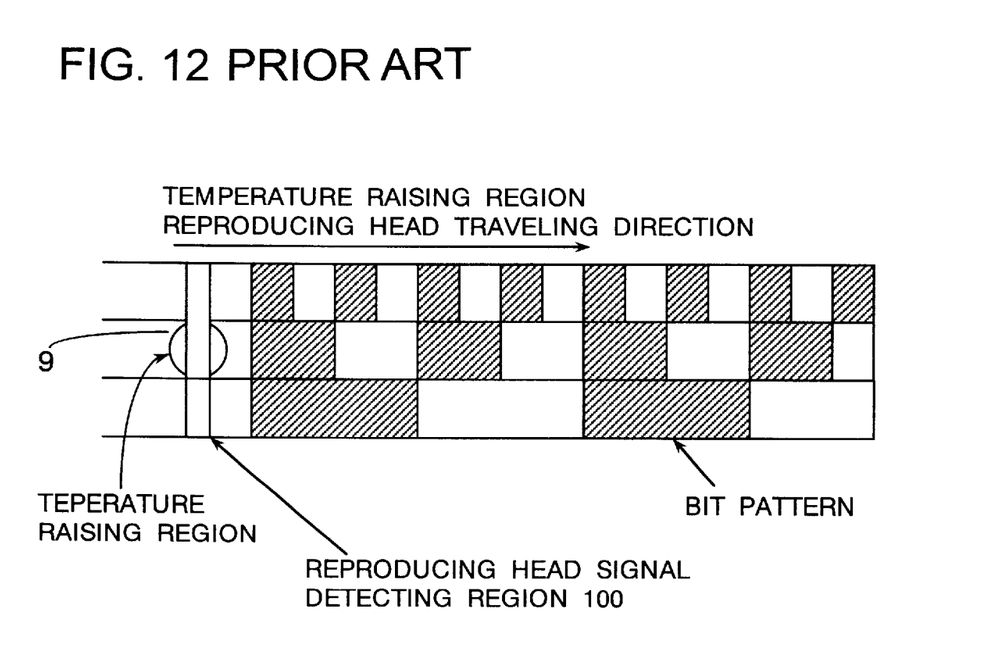
FIG. 12 is a view illustrating an example of a reproducing method according to a thermally assisted magnetic signal reproducing method which has been conventionally proposed.

FIG. 12 is a schematic view showing an information recording state on a magnetic recording medium (a bit pattern). Illustrated is magnetically recorded information which is recorded on three tracks by a magnetization into three kinds of different patterns. There is taken the case where only the magnetically recorded information on a central track is reproduced by using a reproducing head (for example, an MR head or the like) having a signal detecting region 100 for three track widths. It is assumed that the magnetic recording medium is a common n-type ferrimagnetic substance having the temperature characteristics for exhibiting a magnetization shown in FIG. 11 and that the magnetic compensation point thereof is almost coincident with a temperature of the medium in the vicinity of a portion provided immediately under the reproducing head in a state where a temperature is not raised.

Figure 13:
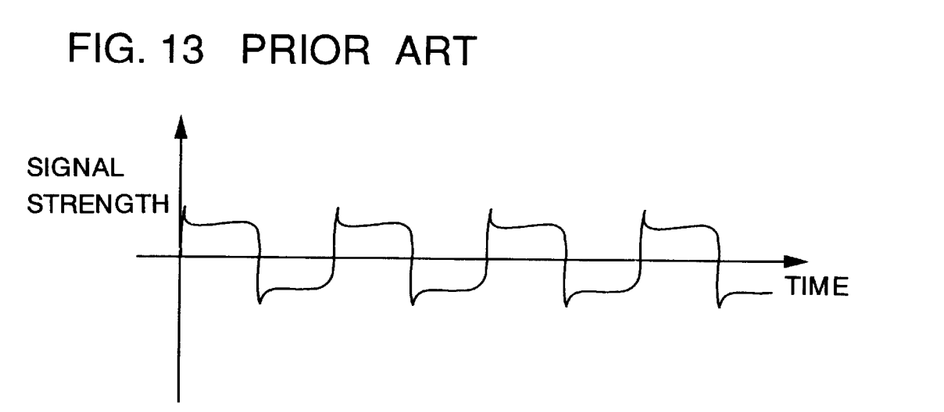
FIG. 13 is a graph illustrating a waveform of a signal output from a magnetic head when a medium temperature in a non-heated region is at a magnetic compensation point according to the reproducing method of FIG. 12.

For reproducing only the central track shown in FIG. 12, a temperature of only the central track is raised with a light beam or the like. If a temperature of a heated region 101 (central track) is set close to T3 (see FIG. 11) and temperatures of regions which are not heated (both adjacent tracks) are set close to a magnetic compensation point T1 (see FIG. 11), the magnetization of the magnetic recording medium is sufficiently enhanced in the heated region 101 (central track) and the magnetization of the non-heated regions (both adjacent tracks) is fully reduced. Consequently, a reproducing signal includes only a magnetic signal in the heated region as shown in FIG. 13. Therefore, only the magnetically recorded information in the central track can selectively be reproduced.

Figure 14:
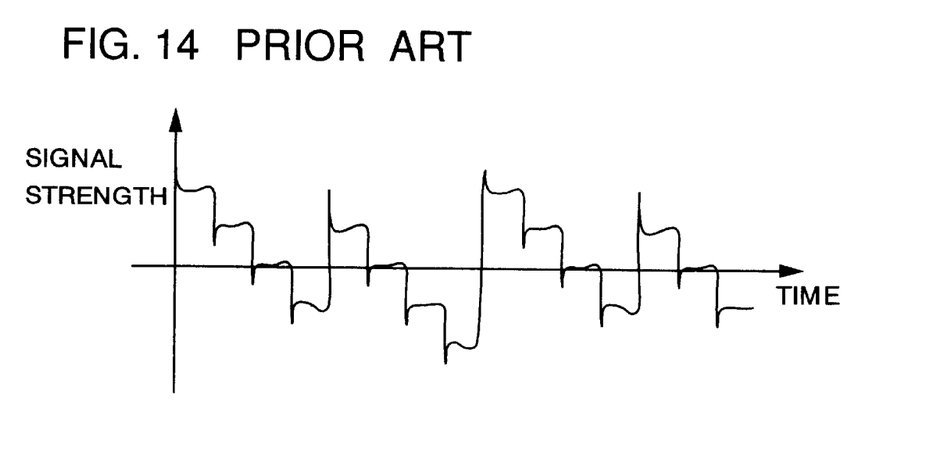
FIG. 14 is a graph illustrating a waveform of an output signal when a signal of a non-heated region is mixed according to the reproducing method of FIG. 12.

However, when an ambient temperature increases, temperatures in the both adjacent tracks, that is, the non-heated regions are changed and shifted from the magnetic compensation point, thereby causing the magnetization of the regions. In this case, information recorded on these regions is mixed in the reproducing signal. For example, when the temperatures in the both adjacent tracks are raised from T1 to T2, respectively (see FIG. 11) and the magnetization of the reproducing signal becomes such an extent that contributes to the heated region by 1/2, a reproducing signal corresponding to a bit pattern in FIG. 12 is obtained as shown in FIG. 14. More specifically, a reproducing signal in which signals sent from the both adjacent tracks are superposed as noises is resulted. In such a case, magnetically recorded information on the central track cannot be accurately reproduced.

As described above, in order to perform high density reproduction in a region which is much smaller than a magnetization detecting region of the reproducing head according to the thermally assisted magnetic signal reproducing method which has been conventionally proposed, it is required that a non-heated region should have a sufficiently small magnetization. In other words, a shift from the magnetic compensation point of the medium temperature should be small. However, even in a working environment which is supposed as very general one, a change in an ambient temperature ranging several tens ° C. is taken place depending on seasons, time or a place for use. Further, a large number of heating sources, for example, a reproducing head, a motor, an electronic circuit and the like are present in the vicinity of the medium. For these reasons, it is not easy to keep the temperature in the non-heated region of the medium close to the magnetic compensation point.

Moreover, there have also been technical problems in that the magnetic compensation point of the ferrimagnetic substance is sensitive to a composition ratio thereof, and it is hard to fabricate a medium having a constant magnetic compensation point over the whole recording regions with high productivity.

As described above, to perform high density reproduction in the above-mentioned thermally assisted magnetic signal reproducing method according to the prior art, it is necessary to fabricate a magnetic recording medium having an almost constant magnetic compensation point over the entire recording regions by strictly controlling a composition ratio thereof. Further, it is also necessary to monitor and control a temperature for a very minute region, i.e., a magnetization detecting region on the reproducing head in order to suppress the influence of tracks adjacent to a track to be reproduced, that is, a crosstalk. This has been very difficult to carry out technologically.

SUMMARY OF THE INVENTION

The present invention provides a magnetic signal reproducing device comprising heating means for locally heating a reproducing region of a magnetic recording medium, first reproducing means for reading magnetic information in the reproducing region in a first temperature state to obtain a first reproduced signal, second reproducing means for reading magnetic information in almost the same region as the reproducing region in a second temperature state which is different from the first temperature state to obtain a second reproduced signal, and correcting means for correcting the first reproduced signal based on the second reproduced signal to obtain an information reproducing signal representing recorded information in the reproducing region.

According to the present invention, a medium temperature is changed to obtain two reproducing signals in almost the same region on the magnetic recording medium and a correction processing is carried out based on these signals to obtain a reproducing signal. Therefore, it is possible to obtain a reproducing signal free from being affected by a magnetic signal which is possibly mixed from the adjacent tracks.

DESCRIPTION OF THE PREFERRED EMBODIMENTS

The present invention provides a magnetic signal reproducing device comprising heating means for locally heating a reproducing region of a magnetic recording medium, first reproducing means for reading magnetic information in the reproducing region in a first temperature state to obtain a first reproduced signal, second reproducing means for reading magnetic information in almost the same region as the reproducing region in a second temperature state which is different from the first temperature state to obtain a second reproduced signal, and correcting means for correcting the first reproduced signal based on the second reproduced signal, thereby obtaining an information reproducing signal representing information recorded in the reproducing region.

In the magnetic signal reproducing device according to the present invention, the first and second reproducing means may be constituted by a single reproducing head and the magnetic information in the reproducing region may be read plural times to obtain the first and second reproduced signals.

The first and second reproducing means can be made of different reproducing heads.

Further, the second reproducing means may be arranged in line with the first reproducing means in a direction of a track of the magnetic recording medium.

The correcting means subtracts one of the first and second reproduced signals from the other reproducing signal, thereby carrying out a correction processing.

Further, the magnetic signal reproducing device may further comprise delay means, wherein after the delay means adjusts time axes of the respective first and second reproduced signals, the correcting means carries out the correction processing.

The heating means may have different thermal outputs at the reading of the magnetic information by the first reproducing means and at the reading of the magnetic information by the second reproducing means.

Still further, the heating means may have a heat supply position relative to a reading position at the reading of the magnetic information by the first reproducing means and another heat supply position relative to another reading position at the reading of the magnetic information by the second reproducing means.

Furthermore, the present invention provides a magnetic signal reproducing method comprising the steps of locally heating a reproducing region of a magnetic recording medium by heating means, reading magnetic information in the reproducing region in a first temperature state by first reproducing means to obtain a first reproduced signal, reading magnetic information in almost the same region as the reproducing region by second reproducing means in a second temperature state which is different from the first temperature state to obtain a second reproduced signal, and correcting the first reproduced signal based on the second reproduced signal, thereby obtaining an information reproducing signal representing recorded information in the reproducing region.

The heating means is capable of locally heating the reproducing region of the magnetic recording medium to a predetermined temperature. For example, a laser beam such as red laser diode, violet laser diode is used as an energy source for the locally heating. Further, the heating means is preferably provided with a lens to converge and irradiate the laser beam locally. Additionally, to control a degree of heating, the heating means is preferably provided with means for modifying a relative positional relationship between the reproducing means and the heated portion or means for changing thermal output (ex. output value of the laser beam) at the reading of the magnetic information.

[Embodiment 1]

In a magnetic recording and reproducing device according to the present embodiment, a magnetic signal in a certain region of a magnetic recording medium is first reproduced by using a reproducing head in a non-heated state (a second temperature state). A reproducing signal thus obtained will be referred to as a reproduced signal at normal temperature (a second reproduced signal). Then, a heated portion is provided by using a local heater in the same region to reproduce a magnetic signal in a heated state (a first temperature state) by using the reproducing head. A reproducing signal thus obtained will be referred to as a reproduced signal at elevated temperature (a first reproduced signal). The reproduced signal at elevated temperature is subtracted from the reproduced signal at normal temperature by means of a subtracting circuit (correcting means).

The structure of the magnetic recording and reproducing device according to the present embodiment will be described below with reference to FIGS. 1 to 3 and an operation thereof will be described with reference to FIGS. 4 to 7.

<Structure>

Figure 1:
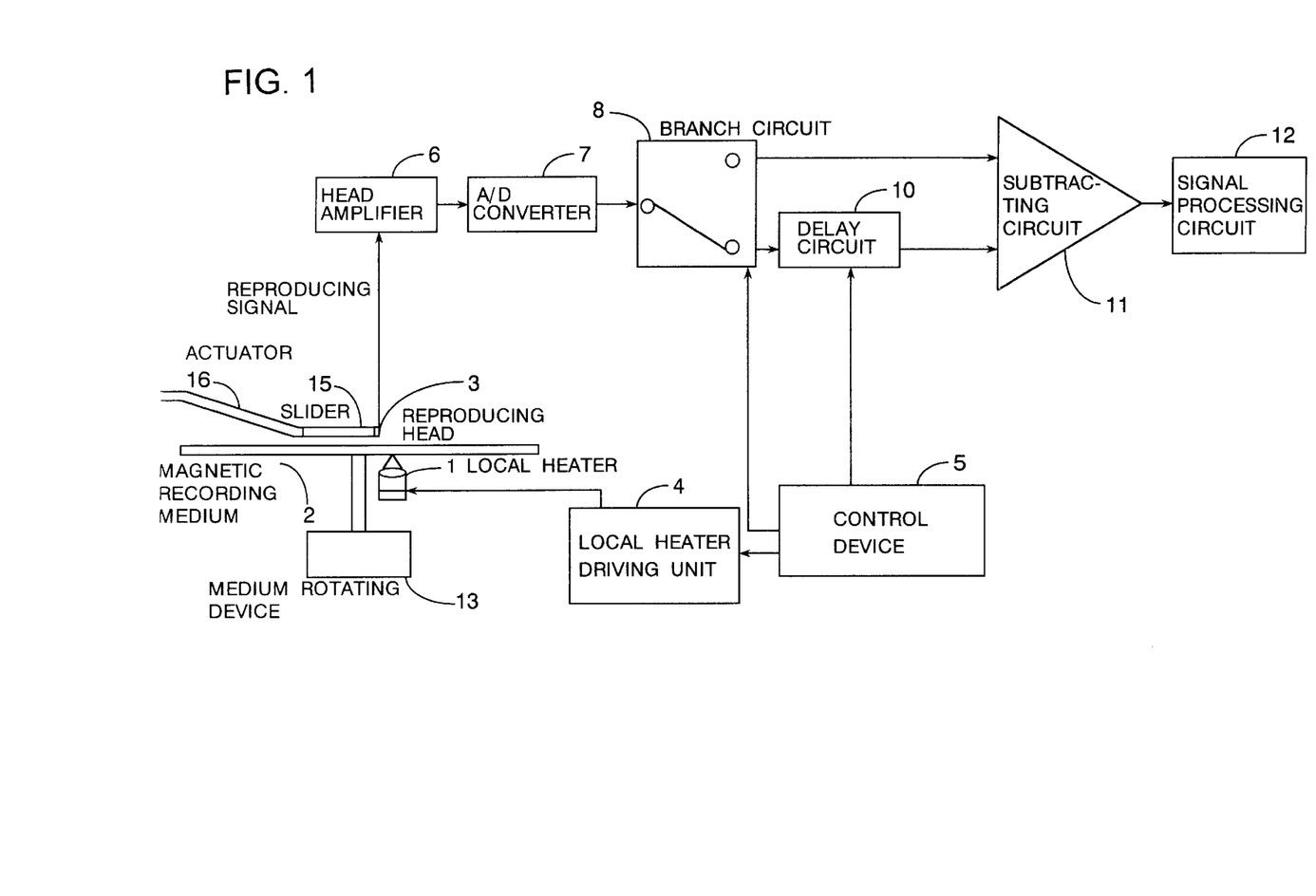
FIG. 1 is a schematic view illustrating a main structure of a magnetic signal reproducing device according to Embodiment 1 of the present invention.

FIG. 1 is a schematic view illustrating the structure of the magnetic recording and reproducing device of the present invention. As shown in FIG. 1, a local heater 1 (which desirably converges and irradiates a laser beam) acting as a heat supply source and a reproducing head 3 for reproducing a magnetic signal of a magnetic recording medium 2 are provided with the magnetic recording medium 2 interposed therebetween. The magnetic recording medium 2 is disc-shaped and rotated at a constant angular velocity by a medium rotating device 13. The reproducing head 3 is fixed to a slider 15 which is driven by an actuator 16. The actuator 16 outputs positional information of the slider 15 to a control device 5 (not shown).

Figure 2:
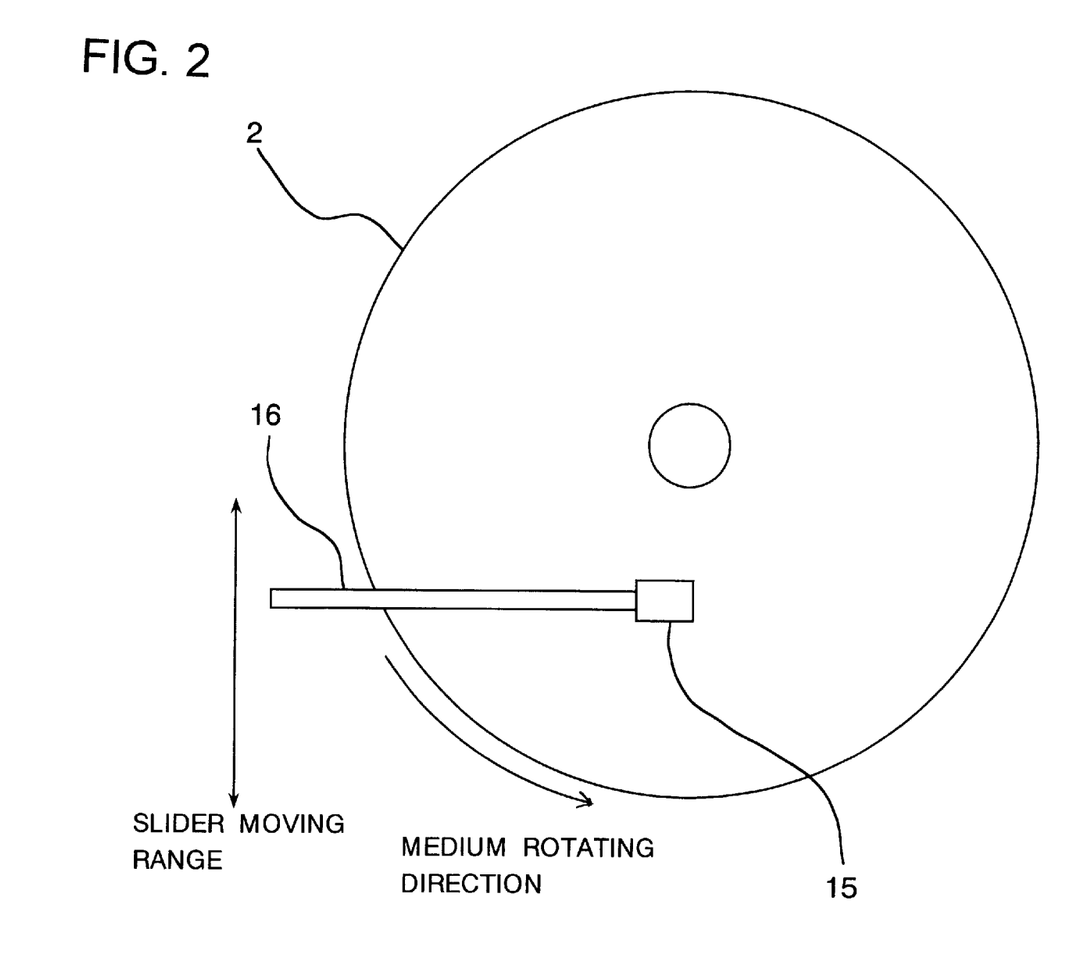
FIG. 2 is a schematic view illustrating a positional relationship among a magnetic recording medium 2, a slider 15 and an actuator 16 of the magnetic signal reproducing device of FIG. 1 viewed from a recording surface side of the magnetic recording medium 2.
Figure 3:
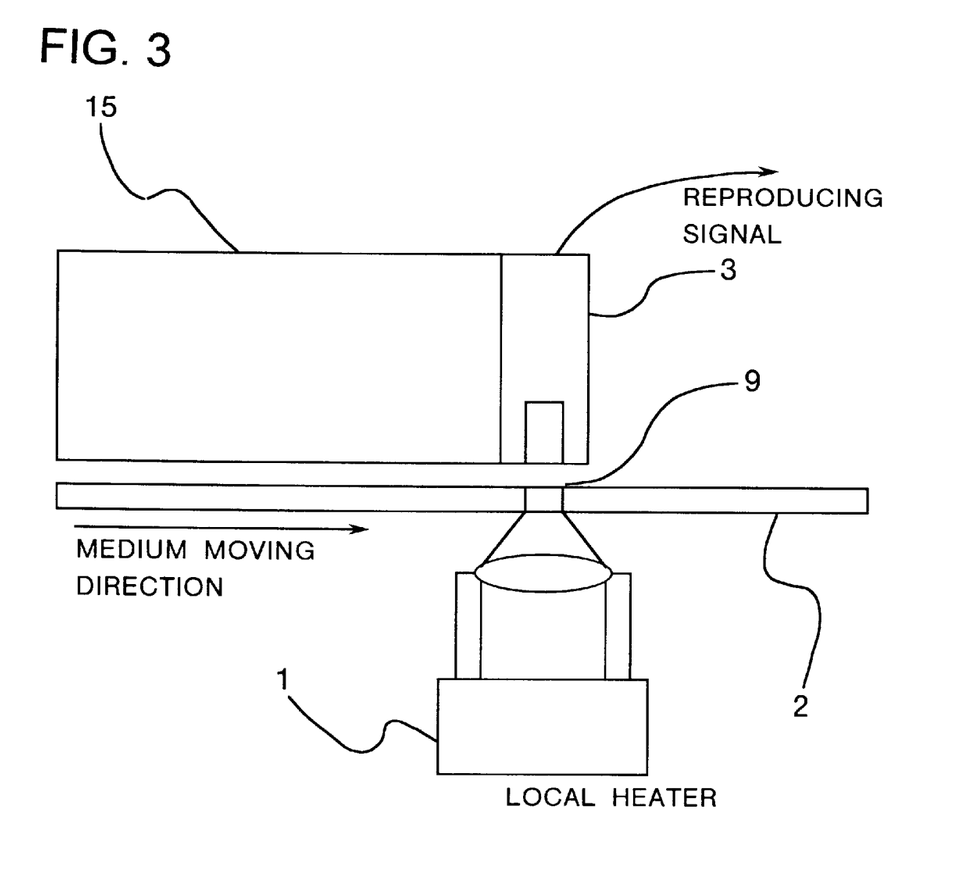
FIG. 3 is an enlarged side view of a main part illustrating a positional relationship among the slider 15, a reproducing head 3, the magnetic signal recording medium 2 and a local heater 1 of the magnetic signal reproducing device of FIG. 1.

FIG. 2 is a view illustrating the operation of the slider 15 and the actuator 16 which are shown in FIG. 1. As shown in FIG. 2, the actuator 16 moves in the radial direction of the magnetic recording medium 2. Consequently, the reproducing head 3 can gain access to almost the whole surface of the magnetic recording medium 2, thereby a magnetic signal can be reproduced.

It is desirable that an n-type ferrimagnetic substance is used as a magnetic material of the magnetic recording medium 2 in the same manner as conventionally proposed by a thermally assisted magnetic signal reproducing method.

The local heater 1 consists of a laser beam source and a converging lens and arranged and adjusted such that a local heating effect is given to a recording region of the magnetic recording medium 2. A local heater driving unit 4 can perform on-off control of the local heater 1 according to a control signal sent from the control device 5. As shown in FIG. 3, the local heater 1 travels with the reproducing head 3 so that a heated portion can be always positioned at a magnetization detecting region of the reproducing head 3.

The reproducing head 3 is arranged and adjusted above a heated portion generated on the magnetic recording medium 2 by the local heater 1. The magnetization detecting region thereof includes a recording region of the magnetic recording medium 2. A reproducing signal output from the reproducing head 3 is input to a head amplifier 6. A region where information magnetically recorded in the magnetic recording medium 2 contributes to an output of the reproducing head 3, that is, a region of the magnetic recording medium 2 which is included in the magnetization detecting region of the reproducing head 3 will be hereinafter referred to as a reproducing region.

The head amplifier 6 amplifies a reproducing signal sent from the reproducing head 3 to output the amplified reproducing signal to an A/D converter 7. The A/D converter 7 serves to convert an analog signal sent from the head amplifier 6 into a digital signal and output the digital signal to a branch circuit 8. The branch circuit 8 selectively outputs the, amplified signal sent from the A/D converter 7 as an input to a subtracting circuit 11 or an input to a delay circuit 10 in response to a control signal sent from the control device 5. The delay circuit 10 delays an input signal by a time specified by the control device 5. The delayed signal is output as another input signal to the subtracting circuit 11. More specifically, the delay circuit 10 comprises a shift register, a buffer memory or the like. In this embodiment, the delay time is a time required for one rotation of the magnetic recording medium 2. The subtracting circuit 11 outputs a subtraction value obtained from two inputs as an input to a signal processing circuit 12. The signal processing circuit 12 reproduces data recorded on the magnetic recording medium 2 from a subtraction signal output by the subtracting circuit 11.

<Operation>

The operation of the above-mentioned magnetic recording and reproducing device shown in FIG. 1 will be described below.

For comparison with the prior art, it is assumed that a bit pattern shown in FIG. 12 is reproduced by using the local heater 1 (a heated region 101) and the reproducing head 3 (a signal detecting region 100 of the reproducing head) which have such a positional relationship as shown in FIG. 12. In the magnetic recording medium 2, a relationship between magnetization and temperature has such characteristics as shown in FIG. 11. A medium temperature is set to T3 during a heating operation performed by the local heater 1 and a medium temperature is set to T2 during a non-heating operation. More specifically, it is assumed that a magnetization is present in portions other than a heated portion, that is, both adjacent tracks while performing a thermally assisted magnetic signal reproduction, and the magnetization contributes to the magnetization in the heated portion with a strength ratio of approximately 1/2 in the reproducing signal.

Figure 7:
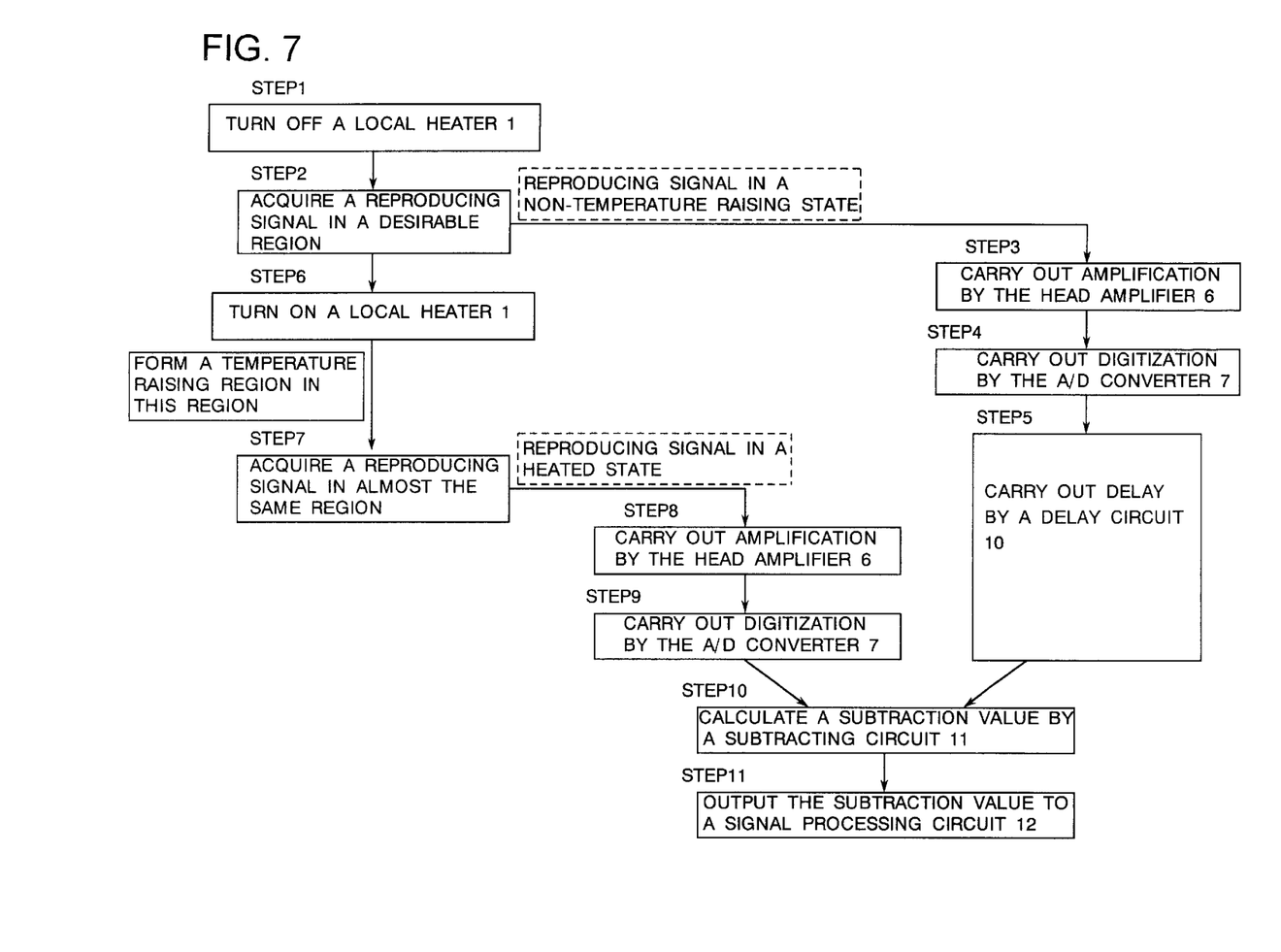
FIG. 7 is a flowchart illustrating an operation of the magnetic signal reproducing device of FIG. 1.

The operation of the magnetic recording and reproducing device will be described below with reference to FIG. 7.

(Step 1)

First of all, the local heater 1 is set so as not to be actuated by the local heater driving unit 4 on receipt of a control signal from the control device 5. Similarly, an output of the branch circuit 8 is connected to the delay circuit 10. As the delay time of the delay circuit 10, a time required for one rotation of the magnetic recording medium 2 is specified by the control device 5.

(Steps 2 to 5)

Figure 5:
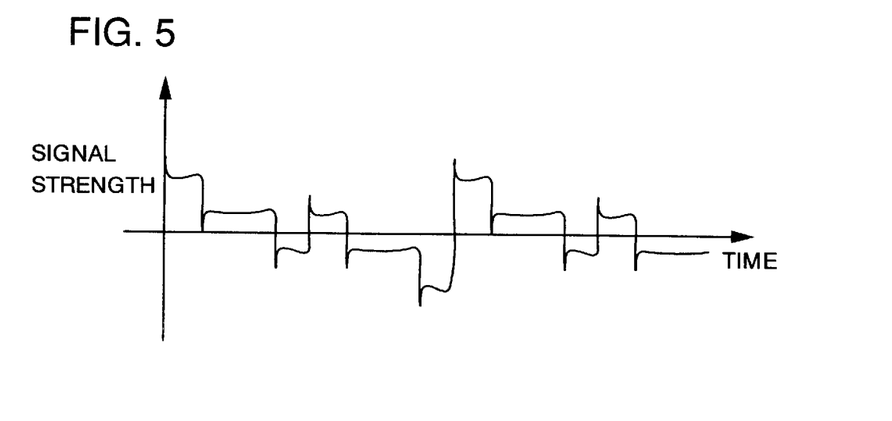
FIG. 5 is a graph illustrating an example of a signal input into a subtracting circuit in a non-heated state according to the magnetic signal reproducing device of FIG. 1.

A magnetic signal of the magnetic recording medium 2 in a non-heating state (a reproduced signal at normal temperature) is read by the reproducing head 3 and input as a quantized digital value to the delay circuit 10 through the head amplifier 6 and the A/D converter 7. FIG. 5 shows a signal waveform input to the delay circuit 10 at this time (the signal waveform is indicated in analog value for easy understanding). A signal obtained by amplifying the reproduced signal at normal temperature. sent from the reproducing head 3 by means of the head amplifier 6 and quantizing the amplified reproducing signal by means of the A/D converter 7 will also be referred to as a reproducing signal.

(Step 6)

After a time that the reproduced signal at normal temperature reproduced by the reproducing head 3 is input to the head amplifier 6, the output of the branch circuit 8 is connected to the subtracting circuit 11 and the control signal of the control device 5 to the local heater 1 is changed to operate the local heater 1. Consequently, a heated portion is provided in the same region as the region where the reproduction is carried out at Step 2.

(Steps 7 to 9)

Figure 4:
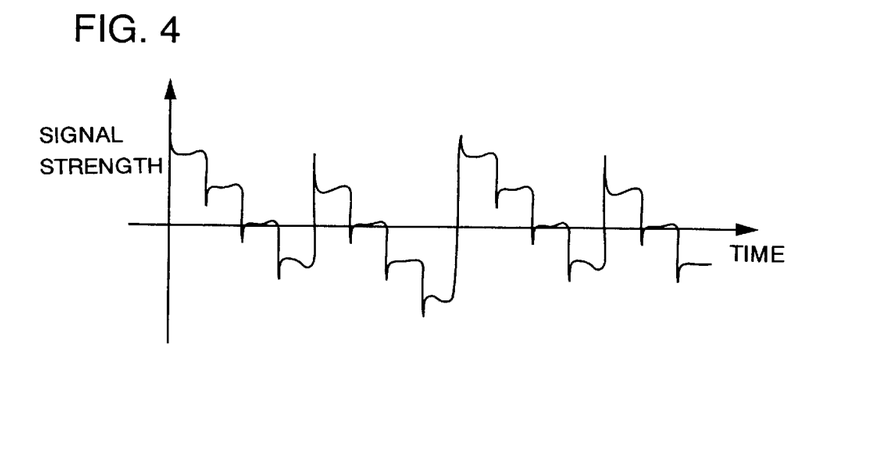
FIG. 4 is a graph illustrating an example of a signal input into a subtracting circuit in a heated state according to the magnetic signal reproducing device of FIG. 1.

A magnetic signal of the reproducing region of the magnetic recording medium 2 in a heated state (a reproduced signal at elevated temperature) is read by the reproducing head 3 and input as a quantized digital value to the branch circuit 8 through the head amplifier 6 and the A/D converter 7, and then output as one of the inputs to the subtracting circuit 11. An input signal waveform is shown in FIG. 4. At the same time, the reproduced signal at normal temperature in the same region which is delayed through the delay circuit 10, that is, the signal shown in FIG. 5 is sent as the other input to the subtracting circuit 11.

(Steps 10 and 11)

Figure 6:
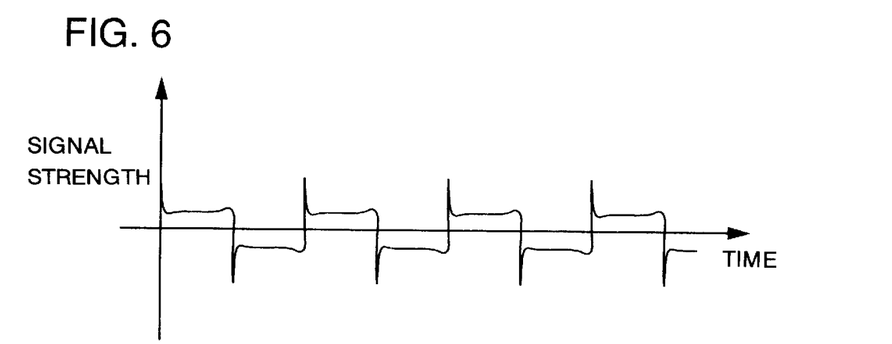
FIG. 6 is a graph illustrating a reproducing signal obtained by subtracting the signals of FIGS. 4 and 5.

When two input signals, i.e., the signal shown in FIG. 4 (the reproduced signal at elevated temperature) and the signal shown in FIG. 5 (the reproduced signal at normal temperature) are given to the subtracting circuit 11, the subtracting circuit 11 is operated to calculate and output a subtraction value of these two signals. FIG. 6 is a graph showing a signal obtained by subtracting the signal of FIG. 5 from the signal of FIG. 4. The subtraction signal is output to the signal processing circuit 12.

The signal processing circuit 12 binarizes the input signal shown in FIG. 6 to output the signal. The output signal represents magnetically recorded information in only a central track shown in FIG. 12.

At Steps S2 and S7 of the above-mentioned operation, it is preferable that a magnetic signal should be read plural times in order to prevent reading errors.

As described above, the magnetic recording and reproducing device of the present invention reproduces magnetically recorded information by subtracting the reproducing signal (FIG. 5) of a certain region where a temperature is low from the reproducing signal (FIG. 4) of almost the same region where a temperature is high. Consequently, it is possible to obtain accurate information from a target track even if a change in an ambient temperature or the like is caused.

Conversely, the magnetically recorded information may be reproduced using a signal obtained by subtracting the signal of FIG. 4 from the signal of FIG. 5.

In the present embodiment, the positional relationship between the local heater 1 and the reproducing head 3 is fixed and the local heater 1 is on-off controlled by the local heater driving unit 4 to change a medium temperature. It is also possible to change a relative positional relationship between a heated portion and a reproducing region by moving a locally heated region independently of the reproducing head 3 with an optional positional relationship between the local heater 1 and the reproducing head 3 or by moving a heated portion using a movable reflecting mirror or the like, thereby varying the medium temperature in the reproducing region.

While the signal (the reproduced signal at normal temperature) for correcting the reproducing signal in a heated state (the first reproduced signal) has been obtained by turning off the local heater 1, the reproducing signal for correction may be obtained by controlling an output in an ON state (changing a thermal output) if a rise time to the ON state of the local heater 1 is long.

For example, it is also possible to invert the on-off control of the local heater driving unit 4 by the control device 5 so as to obtain a reproducing signal in a heated state earlier and then obtain a reproducing signal in a non-heated, state, thereby subtracting the former from the latter.

Further, while the delay time of the delay circuit 10 is set to a time required for one rotation of the magnetic recording medium 2, it is not limited thereto. However, it is desirable that the delay time should be set to an integral number of times as long as the rotation time of the magnetic recording medium 2 in order to cause no useless waiting time when the same region on the magnetic recording medium 2 is reproduced by the reproducing head 3 twice, that is, in the non-heated state and the heated state.

[Embodiment 2]

In Embodiment 1, the same region on the magnetic recording medium is reproduced twice (during the non-heated state and the heated state) by one reproducing head to carry out a subtraction between the reproduced signal at normal temperature and the reproduced signal at elevated temperature. In this embodiment, heated and reproduced signal at normal temperatures of the almost same region on a magnetic recording medium are obtained independently by using two reproducing heads to carry out a subtraction thereof. The structure and operation of a magnetic recording and reproducing device according to the present embodiment will be described below. For convenience of the description, components having the same functions as those in Embodiment 1 have the same reference numerals and their description will be omitted.

<Structure>

Figure 8:
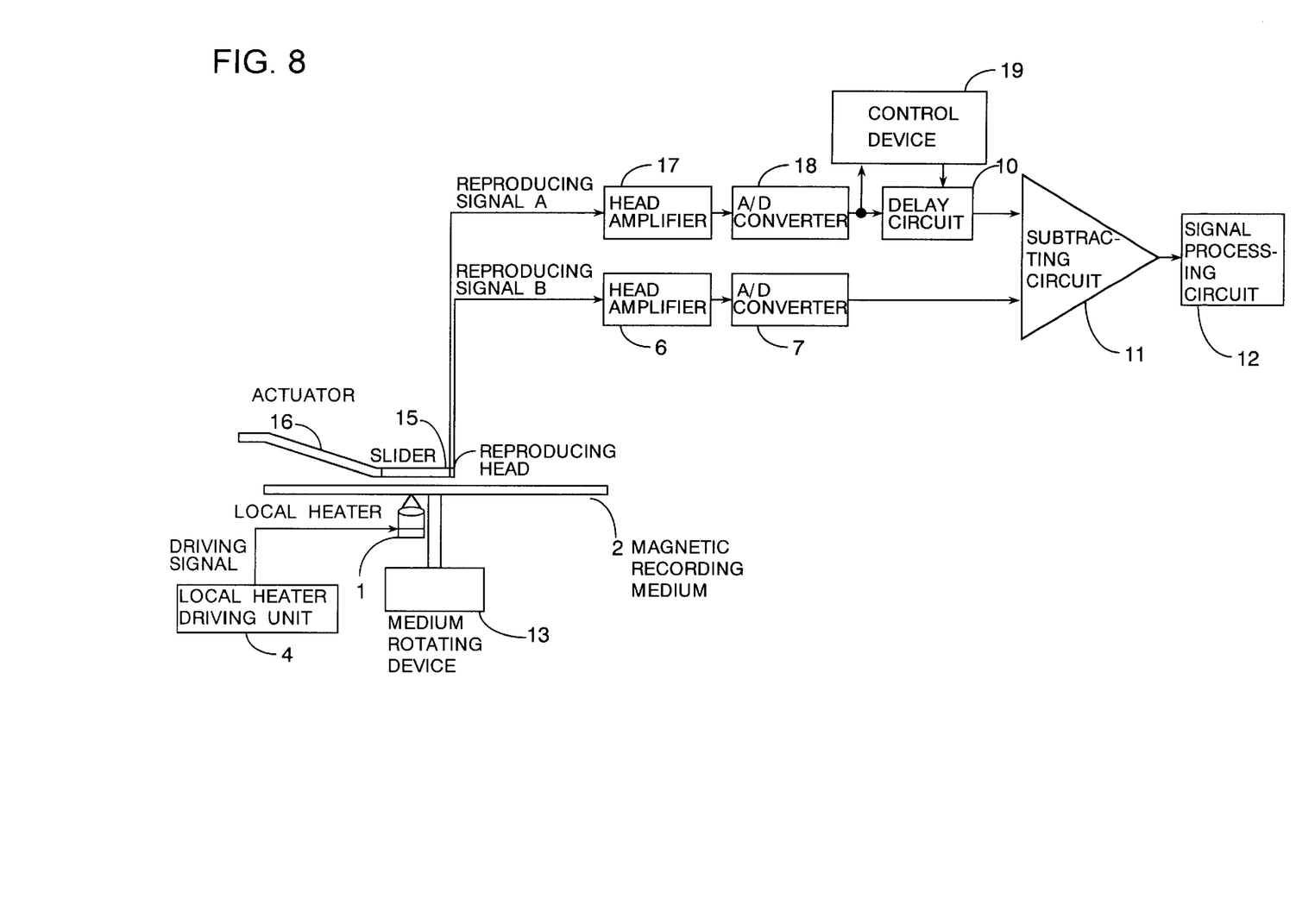
FIG. 8 is a schematic view illustrating a main structure of a magnetic signal reproducing device according to Embodiment 2 of the present invention.

FIG. 8 is a schematic view illustrating the structure of a magnetic signal reproducing device according to the present embodiment. A local heater 1 and reproducing heads 3 and 14 are provided with a magnetic recording medium 2 interposed therebetween.

Figure 9:
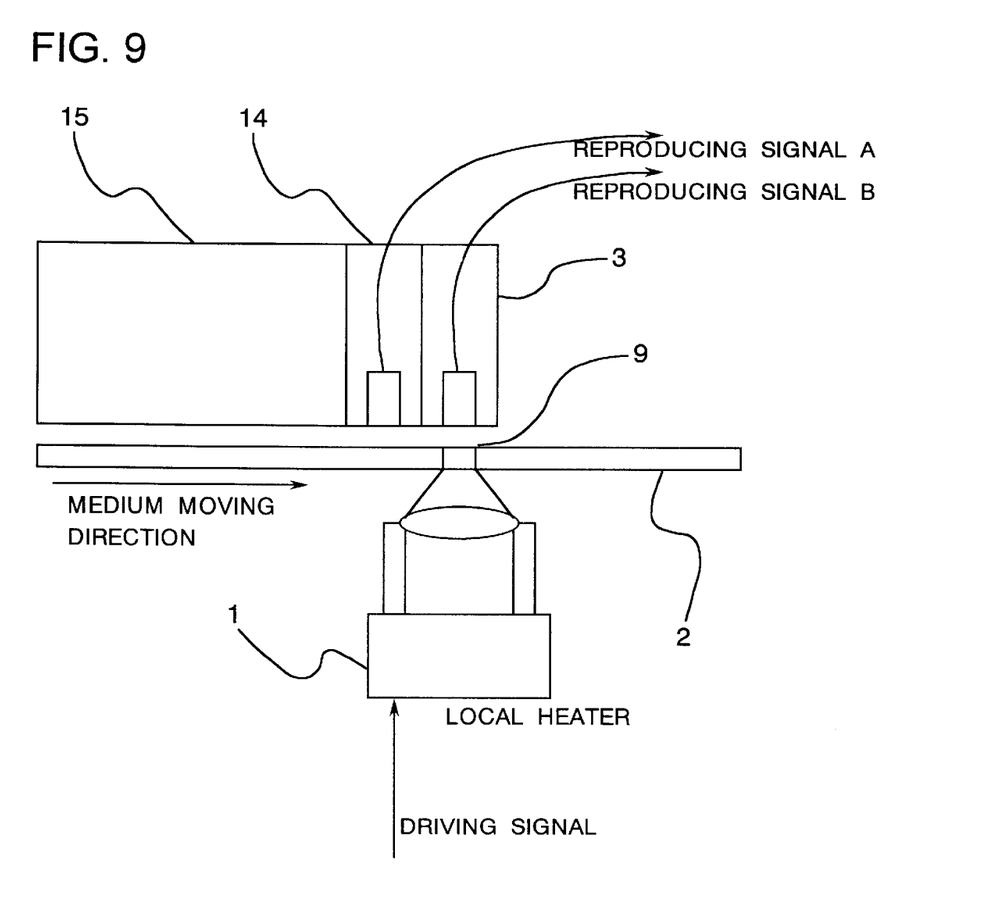
FIG. 9 is an enlarged side view of a main part illustrating a positional relationship among a slider 15, a reproducing head 14, a reproducing head 3, a magnetic recording medium 2 and a local heater 1 of the magnetic signal reproducing device shown in FIG. 8.

FIG. 9 is a view illustrating the arrangement of the reproducing heads 3 and 14. As shown in FIG. 9, these two reproducing heads 3 and 14 are arranged in a moving direction of the medium (a track direction). The reproducing head 3 is provided in a position faced to a heated region 9 heated by the local heater 1. On the other hand, the reproducing head 14 is positioned ahead of the reproducing head 3 while rotating the medium so as not to face the heated region 9 in the magnetic recording medium 2. With such an arrangement, the reproducing head 14 first reproduces a region and then the reproducing head 3 reproduces the same region with the rotation of the magnetic recording medium 2 which is performed by a medium rotating device 13. The reproducing head 14 and the reproducing head 3 are fixed to the same slider 15.

An output of the reproducing head 3 is input to a head amplifier 6. A magnetic signal thus amplified is input to an A/D converter 7 and output as quantized digital data as one of inputs to a subtracting circuit 11. On the other hand, an output of the reproducing head 14 is input to a head amplifier 17. A magnetic signal thus amplified is input to an A/D converter 18 and input as quantized digital data to a delay circuit 10. The delay circuit 10 outputs the input signal as the other input to the subtracting circuit 11 through a time delay specified by a control device 19. An output of the subtracting circuit 11 is input to a signal processing circuit 12.

The control device 19 serves to calculate a delay time based on positional information about the slider 15 which is sent from an actuator 16 and to control the delay time of the delay circuit 10. The delay time is set as a time taken while a region reproduced by the reproducing head 14 is moved to substantially correspond to a magnetization detecting region of the reproducing head 3 by the rotation of the magnetic recording medium 2. More specifically, where a rotational angular velocity is represented by $\omega$ (/sec), a distance of the slider 15 from a center of rotation is represented by r (m) and a distance between almost central portions of the magnetization detecting regions of the reproducing head 3 and the reproducing head 14 is represented by d (m), the delay time is defined approximately as $d/(r \times \omega)$ (sec) on the assumption that d is much smaller than r. For example, where a distance between the reproducing head 3 and the reproducing head 14 is 20 $\mu$m and the magnetic recording medium 2 is rotated 3600 times per minute, a delay time in a position from a center by 5 cm is approximately $1.06 \times 10^{-6}$ second.

If the delay time is thus set to a value which is varied depending on the radial position of a reproducing region, a proper delay time can be set according to a linear velocity of the reproducing region also in the case where the magnetic recording medium 2 is driven at a constant angular velocity. Thus, an accurate reproducing operation can be achieved.

<Operation>

Figure 10:
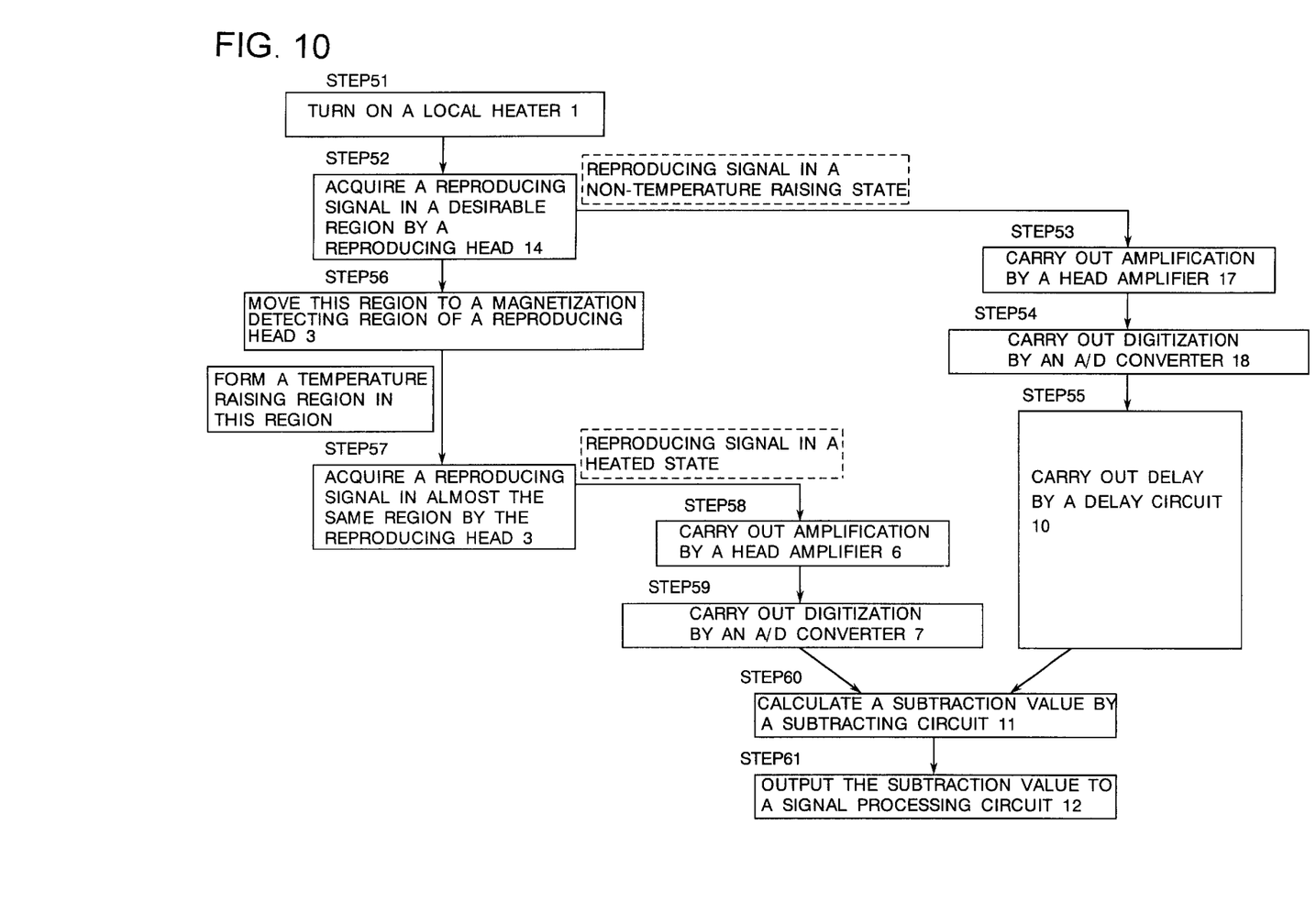
FIG. 10 is a flowchart illustrating an operation of the magnetic signal reproducing device of FIG. 8.

Next, the operation of the magnetic recording and reproducing device will be described below with reference to FIG. 10.

(Step 51)

The magnetic recording medium 2 is rotated at a constant angular velocity by the medium rotating device 13 and a temperature of the magnetic recording medium 2 is raised by the local heater 1. The heating operation is executed during reproduction.

(Step 52)

A signal in a reproducing region is read by the reproducing head 14. As described above, the reproducing head 14 is arranged corresponding to a non-heated region in the magnetic recording medium 2. Therefore, a reproducing signal obtained at this time is a reproduced signal at normal temperature.

(Steps 53 to 55)

The reproduced signal at normal temperature is amplified and quantized through the head amplifier 17 and the A/D converter 18, and then input to the delay circuit 10.

(Steps 56 and 57)

After a signal is read by the reproducing head 14 at Step 52, the reproducing region is moved by the medium rotating device 13 to a position almost under the magnetization detecting region of the reproducing head 3 and the heated region heated by the local heater 1. Then the reproducing head 3 reads a signal (a reproduced signal at elevated temperature) from the reproducing region.

(Steps 58 and 59)

The reproduced signal at elevated temperature is amplified and quantized through the head amplifier 6 and the A/D converter 7, and then input to the subtracting circuit 11.

(Steps 60 and 61)

At this time, the reproducing signal generated by the reproducing head 14 in almost the same region through the delay circuit 10 (the reproduced signal at normal temperature) is given as the other input to the subtracting circuit 11. The subtracting circuit 11 outputs a subtraction value obtained by the two input signals to the signal processing circuit 12.

As described above, it is possible to obtain, as an output, a subtraction value of a magnetic signal in a heated state of a magnetic recording region in the magnetic recording medium 2 and a magnetic signal in a non-heated state in almost the same region.

In general, a transition time from the non-heated state to the heated state by local heating is shorter than a transition time from the heated state to the non-heated state by spontaneous heat radiation. Therefore, if the reproducing head 14 for reproducing a magnetic signal in the non-heated state is provided ahead of the reproducing head 3 for reproducing a magnetic signal in the heated state as described above, a change in the temperature can be more increased than in an arrangement having a reverse order. However, in the case where the above-mentioned transition times have lengths reverse to each other, it is desirable that the heated region heated by the local heater 1 should be provided under the reproducing head 14 to delay the reproducing signal of the magnetic recording medium 2 in the heated state, thereby performing a subtraction between the delayed reproducing signal and the magnetic signal in the non-heated state in the same region.

While a digital signal processing has been used based on the retention of the signal and the flexibility of the signal processing in the above-mentioned embodiments, it is also possible to implement a subtraction by an analog signal processing with a structure in which the A/D converter 7 and the A/b converter 18 are omitted and the delay circuit 10 and the subtracting circuit 11 carry out an analog processing, if it is expected that the retention of the reproducing signal is sufficient by using an analog delay circuit.

Although the subtraction processing has been used for the correction of the reproducing signal and the subtracting circuit has been used as correcting means in terms of the simple structure of the device and the like in the above-mentioned embodiments, it is also possible to use a comparison processing for the correction of the reproducing signal and to use a comparing circuit as the correcting means.

While one reproducing signal (the reproduced signal at normal temperature) has been used for the correction of the reproducing signal (the reproduced signal at elevated temperature) in the above-mentioned embodiments, a plurality of reproducing signals may be used to correct the reproducing signal.

According to the present invention, the medium temperature is changed to obtain a plurality of reproducing signals in almost the same region on the magnetic recording medium and the reproducing signals are subjected to an arithmetic processing. Consequently, a magnetic signal mixed from adjacent tracks and the like can be removed. Thus, a magnetic signal can be reproduced with a small track width.

What is claimed is:

1. A magnetic signal reproducing device comprising;
   heating means for locally heating a reproducing region of a magnetic recording medium,
   first reproducing means for reading magnetic information in the reproducing region in a first temperature state to obtain a first reproduced signal,
   second reproducing means for reading magnetic information in almost the same region as the reproducing region in a second temperature state which is different from the first temperature state to obtain a second reproduced signal, and
   correcting means for correcting the first reproduced signal based on the second reproduced signal to obtain an information reproducing signal representing information recorded in the reproducing region.

2. The magnetic signal reproducing device according to claim 1, wherein the first and second reproducing means are comprised of a single reproducing head and the reproducing head reads magnetic information plural times to obtain the first reproduced signal and the second reproduced signal.

3. The magnetic signal reproducing device according to claim 1, wherein the first and second reproducing means are comprised of different reproducing heads.

4. The magnetic signal reproducing device according to claim 3, wherein the second reproducing means is arranged in line with the first reproducing means in a direction of a track of the magnetic recording medium.

5. The magnetic signal reproducing device according to any one of claims 1 to 4, wherein the correcting means subtracts one of the first and second reproduced signals from the other reproduce signal.

6. The magnetic signal reproducing device according to any one of claims 1 to 4, further comprising delay means, wherein, after the delay means adjusts time axes of the respective first and second reproduced signals, the correcting means carries out a correction processing.

7. The magnetic signal reproducing device according to any one of claims 1 to 4, wherein the heating means changes a thermal output at the reading of the magnetic information by the first reproducing means and a thermal output at the reading of the magnetic information by the second reproducing means.

8. The magnetic signal reproducing device according to any one of claims 1 to 4, wherein the heating means changes a heat supply position relative to a reading position at the reading of the magnetic information by the first reproducing means and a heat supply position relative to a reading position at the reading of the magnetic information by the second reproducing means.

9. The magnetic signal reproducing device according to any one of claims 1 to 4, wherein the first temperature state is a state where the reproducing region is sufficiently heated by the heating means to an extent that the recorded information is able to be reproduced and the second temperature state is a state where the reproducing region is not heated.

10. The magnetic signal reproducing device according to claim 5, further comprising delay means, wherein, after the delay means adjusts time axes of the respective first and second reproduced signals, the correcting means carries out a correction processing.

11. The magnetic signal reproducing device according to claim 5, wherein the heating means changes a thermal output at the reading of the magnetic information by the first reproducing means and a thermal output at the reading of the magnetic information by the second reproducing means.

12. The magnetic signal reproducing device according to claim 6, wherein the heating means changes a thermal output at the reading of the magnetic information by the first reproducing means and a thermal output at the reading of the magnetic information by the second reproducing means.

13. The magnetic signal reproducing device according to claim 5, wherein the heating means changes a heat supply position relative to a reading position at the reading of the magnetic information by the first reproducing means and a heat supply position relative to a reading position at the reading of the magnetic information by the second reproducing means.

14. The magnetic signal reproducing device according to claim 6, wherein the heating means changes a heat supply position relative to a reading position at the reading of the magnetic information by the first reproducing means and a heat supply position relative to a reading position at the reading of the magnetic information by the second reproducing means.

15. A magnetic signal reproducing method comprising the steps
   locally heating a reproducing region of a magnetic recording medium by heating means and reading by first reproducing means magnetic information in the reproducing region in a first temperature state to obtain a first reproduced signal,
   reading by second reproducing means magnetic information in almost the same region as the reproducing region in a second temperature state which is different from the first temperature state to obtain a second reproduced signal, and
   correcting the first reproduced signal based on the second reproduced signal to obtain an information reproducing signal representing information recorded in the reproducing region.

* * * * *